(12) United States Patent
Ogata et al.

(10) Patent No.: US 8,739,992 B2
(45) Date of Patent: Jun. 3, 2014

(54) MULTILAYERED COSMETIC CONTAINER

(75) Inventors: Satoshi Ogata, Tokyo (JP); Kenzo Teshima, Tokyo (JP); Susumu Hirose, Tokyo (JP)

(73) Assignee: Yoshida Industries Co., Ltd., Tokyo (JP)

( * ) Notice: Subject to any disclaimer, the term of this patent is extended or adjusted under 35 U.S.C. 154(b) by 0 days.

(21) Appl. No.: 13/291,952

(22) Filed: Nov. 8, 2011

(65) Prior Publication Data

US 2012/0118850 A1 May 17, 2012

(30) Foreign Application Priority Data

Nov. 9, 2010 (JP) ................................. 2010-250967
Oct. 3, 2011 (JP) ................................. 2011-218876

(51) Int. Cl.
| | | |
|---|---|---|
| B65D 23/02 | (2006.01) | |
| B65D 23/08 | (2006.01) | |
| B65D 90/04 | (2006.01) | |
| B65D 1/40 | (2006.01) | |
| B65D 6/14 | (2006.01) | |
| B65D 8/06 | (2006.01) | |
| A45D 40/00 | (2006.01) | |

(52) U.S. Cl.
USPC .......... 215/12.1; 215/371; 220/662; 220/675; 220/62.11; 220/62.22; 220/669; 206/581; 206/823; 132/286; 264/271.1; 401/192

(58) Field of Classification Search
USPC ..................... 215/12.1, 371, 13.1; 264/271.1; 220/662, 675, 62.11–62.15, 62.22, 220/669; 401/192, 194; 206/581, 823; 132/286–307, 313–316
See application file for complete search history.

(56) References Cited

U.S. PATENT DOCUMENTS

| | | | | |
|---|---|---|---|---|
| 2,981,984 | A | * | 5/1961 | Orr .............................. 264/45.4 |
| 3,037,652 | A | * | 6/1962 | Wallace ....................... 215/12.2 |
| 7,988,897 | B2 | | 8/2011 | Yamamoto et al. |
| 2002/0175136 | A1 | * | 11/2002 | Bouix et al. .................. 215/12.2 |
| 2006/0210746 | A1 | * | 9/2006 | Shi et al. ...................... 428/35.7 |
| 2011/0210481 | A1 | | 9/2011 | Yamamoto et al. |

FOREIGN PATENT DOCUMENTS

| | | |
|---|---|---|
| JP | 4377447 B1 | 12/2009 |
| WO | 2008010600 A1 | 1/2008 |

* cited by examiner

*Primary Examiner* — Fenn Mathew
*Assistant Examiner* — Jennifer Castriotta
(74) *Attorney, Agent, or Firm* — Smith Patent Office

(57) ABSTRACT

A multilayered cosmetic container including a hollow inner container including a neck portion, a body portion with a diameter larger than that of the neck portion, and a shoulder portion, which connects the body portion to the neck portion, and a transparent outer layer over-molded on an outer side of the hollow inner container except a part of the neck portion, in which a curvature radius of a shoulder tip, which connects the shoulder portion to the body portion of the hollow inner container, is smaller than the curvature radius of the shoulder tip of the outer layer, which covers the shoulder tip of the hollow inner container, and centers of the curvature radii of the shoulder tip of the hollow inner container and of the shoulder tip of the outer layer do not conform to each other.

5 Claims, 4 Drawing Sheets

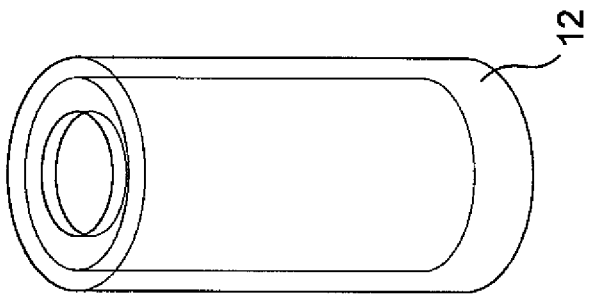
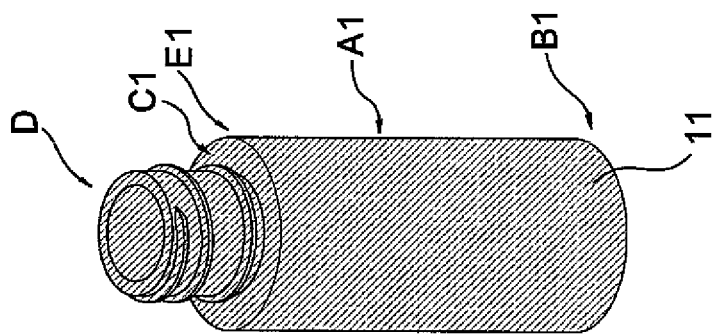
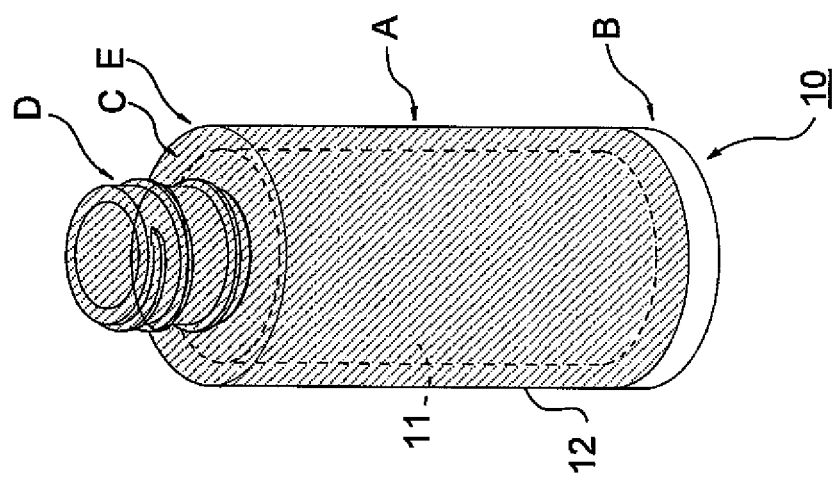

FIG. 2A
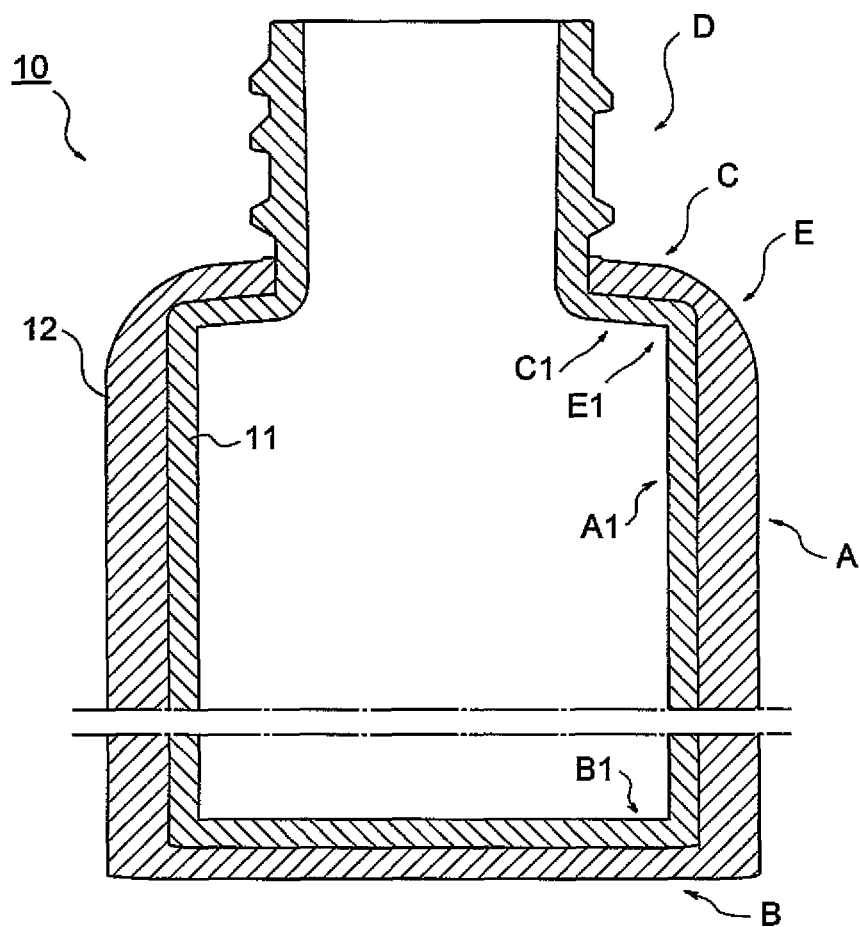
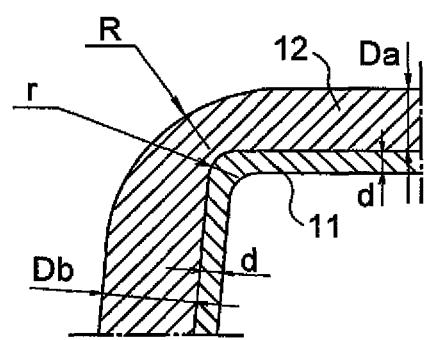
FIG. 2B

MULTILAYERED COSMETIC CONTAINER

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION (1) Field of the Invention

The present invention relates to a multilayered cosmetic container obtained by covering an opaque or translucent hollow inner container with a transparent or translucent outer layer.

The present invention may be utilized in a molded product obtained by covering the opaque or translucent hollow inner container with a transparent or translucent transmissive outer layer.

(2) Description of Related Art Including Information Disclosed Under 37 CFR 1.97 and 1.98

Japanese Patent No. 4377447 discloses a multilayered cosmetic container obtained by covering (hereinafter, over-molding) an opaque or translucent hollow inner container with a transparent or translucent transmissive outer layer. In this type of container, strength of an entire container is improved by an outer layer protecting the hollow inner container, and in addition, decoration property is excellent by an expression of a unique appearance obtained by a pattern of the hollow inner container seen through the transmissive outer layer. Therefore, this is used as the cosmetic product container in which durability and the appearance are important.

However, in a process of manufacturing the multilayered cosmetic container in which the hollow inner container made of a synthetic resin with a hollow inner portion including a neck portion, which forms an opening, a body portion with a diameter larger than that of the neck portion, and a shoulder portion, which connects the body portion to the neck portion, is over-molded with the outer layer formed by injection of a melting resin on an outer side of the hollow inner container except a part of the neck portion or an entire neck portion, or the entire neck portion and a part of the shoulder portion, rigidity of the hollow inner container is not necessarily sufficient when forming the outer layer, so that there is a problem that the hollow inner container is crushed or deformed due to slight change in pressure and temperature.

Especially, the melting resin, which flows from the body portion to the shoulder portion, stagnates or a disturbed flow thereof is generated on a portion on which a flowing direction changes, that is to say, on a shoulder tip and a bottom corner portion, so that the pressure applied to the hollow inner container and a resin temperature likely change, and as a result, the corner portion of the hollow inner container and a periphery thereof are prone to be crushed.

As a countermeasure against this, it is effective to keep a flow rate and the pressure of the melting resin when forming the outer layer constant as far as possible by making a curvature of the outer layer, which covers the corner portion of the hollow inner container, the same as the curvature of the corner portion of the hollow inner container and by making a thickness of the outer layer uniform over an area as wide as possible along a shape of the hollow inner container.

However, with such a shape, there is a case in which a color of the corner portion, especially the shoulder tip of the hollow inner container, which is seen through the outer layer, appears in a light color highlighted against the color of a peripheral portion, which should essentially appear in the same color, according to a principle to be describer later. Then, a boundary between a portion, which appears in the light color, and a portion, which does not appear in the light color, is seen as a shadow of a cosmetic product filled in the container, so that there is a case in which, even when the cosmetic product is used and the contents are reduced actually, an appearance causes misunderstanding that the contents are always left to the shoulder tip.

An object of the present invention is to provide a structure capable of stably forming the multilayered cosmetic container having a specific shape with the outer layer of the multilayered cosmetic container relatively thin and without crushing the hollow inner container while inhibiting a phenomenon that the color of the corner portion of the hollow inner container appears to change by light, which passes through the transparent or translucent outer layer.

BRIEF SUMMARY OF THE INVENTION

A multilayered cosmetic container, includes an opaque or translucent hollow inner container made of a synthetic resin with a hollow inner portion including a neck portion, which forms an opening, a body portion with a diameter larger than a diameter of the neck portion, and a shoulder portion, which connects the body portion to the neck portion, and a transparent or translucent outer layer formed by injection of a melting resin over-molded on an outer side of the hollow inner container except a part of the neck portion or an entire neck portion, or the entire neck portion and a part of the shoulder portion, wherein a curvature radius of a shoulder tip, which connects the shoulder portion to the body portion of the hollow inner container is smaller than the curvature radius of a shoulder tip of the outer layer, which covers the shoulder tip of the hollow inner container, and centers of the curvature radii of the shoulder tip of the hollow inner container and the shoulder tip of the outer layer do not conform to each other.

Also, the multilayered cosmetic container in which difference in outer diameter between the neck portion and the body portion is at least not smaller than 3 mm on a minimum site, a curvature of the shoulder tip between the body portion and the shoulder portion of the hollow inner container and the curvature of the outer layer, which covers the same, are not smaller than 1.0 mm, and a thickness of the outer layer on an end point of a bending portion of the shoulder tip, which connects the body portion to the shoulder portion, in a drooping direction is not larger than 3.5 mm on a maximum site is also possible.

Also, the multilayered cosmetic container in which the curvature radius of the shoulder tip of the outer layer is 5 to 15 mm, and the curvature radius of the shoulder tip of the hollow inner container is not smaller than 1.0 mm is also possible.

Also, the multilayered cosmetic container in which the curvature radius of the shoulder tip of the outer layer between the body portion and the shoulder portion of the hollow inner container is not smaller than twice as large as the curvature radius of the shoulder tip, which connects the shoulder portion to the body portion of the hollow inner container is also possible.

Another configuration for achieving the above-described object is a multilayered cosmetic container, including: an opaque or translucent hollow inner container made of a synthetic resin with a hollow inner portion, including a neck portion, which forms an opening, a body portion with a diameter larger than that of the neck portion, and a bottom corner portion, which connects the body portion to a bottom surface of the container; and a transparent or translucent outer layer formed by injection of a melting resin over-molded on an outer side of the hollow inner container except a part of the neck portion or an entire neck portion, or the entire neck portion and a part of the shoulder portion, in which a curvature radius of the bottom corner portion between the body portion of the hollow inner container and the bottom surface of the container is smaller than the curvature radius of a bottom corner portion of the outer layer, which covers the bottom corner portion, and centers of the curvature radii of the bottom corner portion and the bottom corner portion of the outer layer do not conform to each other.

Also, the multilayered cosmetic container in which difference in outer diameter between the neck portion and the body portion is at least not smaller than 3 mm on a minimum site, a curvature of the bottom corner portion between the body portion of the hollow inner container and the bottom surface of the container and the curvature of the outer layer, which covers the same, are not smaller than 1.0 mm, and a thickness of the outer layer on an end point of a bending portion of the bottom corner portion, which connects the body portion to the bottom surface of the container, in a drooping direction is not smaller than 2.8 mm on the minimum site is also possible.

Also, the multilayered cosmetic container in which the curvature radius of the bottom corner portion of the outer layer is 2 to 10 mm and the curvature radius of the bottom corner portion of the hollow inner container is not smaller than 1.0 mm is also possible.

By configuring as described above, it is possible to provide a structure capable of stably forming the multilayered cosmetic container having the specific shape with the outer layer of the multilayered cosmetic container relatively thin and without crushing the hollow inner container while inhibiting the phenomenon that the color of the corner portion of the hollow inner container appears to change by the light, which passes through the transparent or translucent outer layer.

Further features of the present invention will become apparent from the following description of exemplary embodiments with reference to the attached drawings.

BRIEF DESCRIPTION OF THE SEVERAL VIEWS OF THE DRAWINGS

FIGS. 1A to 1C are schematic illustrative diagrams of a configuration of a multilayered cosmetic container according to this embodiment;

FIGS. 2A and 2B are cross-sectional views of a shoulder portion of the multilayered cosmetic container according to this embodiment;

DETAILED DESCRIPTION OF THE INVENTION

Configuration of Multilayered Cosmetic Container 10

Figure 3:
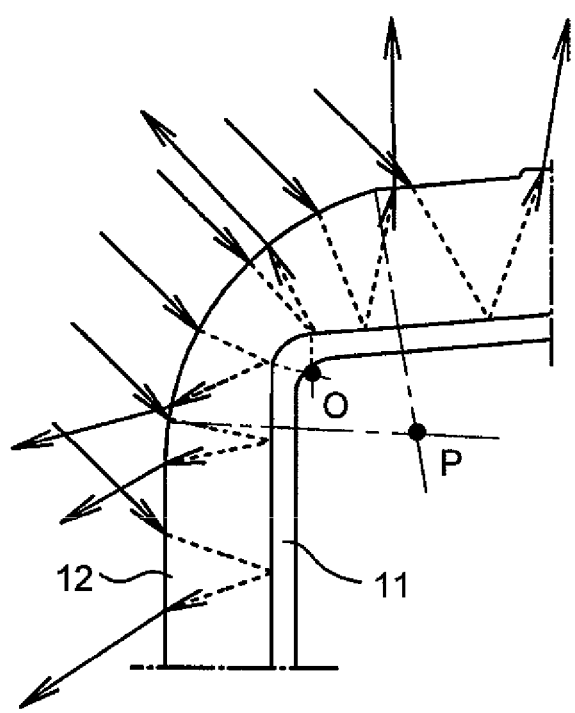
FIG. 3 is an illustrative diagram of the multilayered cosmetic container according to an example.

This embodiment is described with reference to the drawings. FIGS. 1A to 1C are schematic perspective views of a configuration of a multilayered cosmetic container according to this embodiment in which FIG. 1A illustrates a multilayered cosmetic container 10, FIG. 1B illustrates a hollow inner container 11, and FIG. 1C illustrates an outer layer 12. FIGS. 2A and 2B are cross-sectional views of a shoulder portion of the multilayered cosmetic container according to this embodiment in which FIG. 2A is a cross-sectional view of the multilayered cosmetic container 10, and FIG. 28 is an enlarged cross-sectional view of a shoulder portion C.

As illustrated in FIGS. 1A to 1C and 2A and 28, the multilayered cosmetic container 10 is composed of an opaque or translucent hollow inner container 11, which accommodates a cosmetic product, and a transparent or translucent outer layer 12 adhered to the hollow inner container 11 to cover an outer portion thereof.

As illustrated in FIGS. 1A and 2A, the multilayered cosmetic container 10 has an integrated bottle shape including each part of a body portion A, a bottom portion B, the shoulder portion C, a neck portion D, and a shoulder tip E. The shoulder tip E is rounded with a curvature not smaller than 1.0 mm. Also, the neck portion D is a periphery of an opening of the container, which is not covered with the outer layer 12, and the neck portion D of the hollow inner container 11 is exposed to the outside. The bottom portion B is not necessarily planar and may have an inverted cone shape, for example, which is not distinguished from the body portion A. Next, a member, which composes the multilayered cosmetic container 10, is described.

The hollow inner container 11 illustrated in FIG. 1B, which composes an inner portion of the multilayered cosmetic container 10, accommodates the cosmetic product. The hollow inner container 11 has the bottle shape formed by blow molding and is composed of a body portion A1, a bottom portion B1, a shoulder portion C1, the neck portion D, and a shoulder tip E1. As with the above-described multilayered cosmetic container 10, the bottom portion B1 is not necessarily planar and may have the inverted cone shape, for example, which is not distinguished from the body portion A.

FIG. 1C is a schematic diagram of the outer layer 12. The outer layer 12 is actually formed so as to adhere to the hollow inner container 11 to cover the same, so that the outer layer 12 is not independently present as illustrated in FIG. 1C. The outer layer 12 is formed by injection molding with a gate location on a side of the bottom portion B after inserting the hollow inner container 11 into a mold not illustrated.

Meanwhile, although a gate is provided on a bottom surface of the container in this embodiment, there is no limitation. That is to say, the gate may be provided on any portions such as the body portion and the neck portion, a plurality of gates may be provided, and this may be appropriately selected according to a product shape.

The outer layer 12 covers the outer portion of the body portion A1, the bottom portion B1, and the shoulder portion C1 of the hollow inner container 11 as illustrated in FIGS. 2A and 2B. That is to say, an outer side of the hollow inner container 11 is over-molded with the outer layer 12. The outer layer 12 is made of a transparent or translucent material, which transmits light, and is specifically made of a synthetic resin.

The outer layer 12 covers an entire outer side of the hollow inner container 11 except the neck portion D. An exposed portion of the hollow inner container 11 may be a part of the neck portion D, or an entire neck portion D and a part of the shoulder portion C, and this embodiment is applied to the multilayered cosmetic container 10 at least of which bottom portion B1 and a portion from the body portion A to an end point of a bending portion of the shoulder tip E toward the shoulder portion C are covered with the outer layer 12.

The shoulder tip E is an edge portion at which the hollow inner container 11 and the outer layer 12 of the multilayered cosmetic container 10 bend with the curvature not smaller than 1.0 mm, and incident light is reflected complexly thereon. Therefore, an appearance thereof differs as described later depending on structures of the hollow inner container 11 and the outer layer 12.

The multilayered cosmetic container 10 in FIG. 1A is obtained by covering an entire hollow inner container 11 with the outer layer 12 with a substantially uniform thickness of 2.8 mm. The thickness of the outer layer 12 according to this embodiment is characterized in that the thickness of the outer layer 12 on the end point of the bending portion of the shoulder tip E, which connects the body portion A to the shoulder portion C, in a drooping direction is not larger than 3.5 mm on a maximum site and the thickness of the outer layer 12 in other area is no object. Since the thickness of an area of the bending portion of the shoulder tip E, which connects the body portion A to the shoulder portion C, of the outer layer 12 is relatively thin, there is a problem that short shot easily occurs in the injection molding of a melting resin, which forms the outer layer.

This embodiment is applied when the curvature of the shoulder tip E1 of the hollow inner container as well as the curvature of the shoulder tip E of the outer layer 12 is not smaller than 1.0 mm, and the curvature of the shoulder tip E1 of the hollow inner container is set to be smaller than the curvature of the shoulder tip E of the outer layer 12. Also, centers of curvature radii of the two shoulder tips of the outer layer and the hollow inner container cannot conform to each other.

Relationship between the structures of the shoulder tips E and E1 and the appearance thereof is specifically described with reference to FIG. 2B.

When both of the curvature of the shoulder tip E1 of the hollow inner container and the curvature of the shoulder tip E of the outer layer 12 are not smaller than 1.0 mm and the centers of the curvature radii substantially conform to each other, as illustrated in FIG. 2B, the incident light on the shoulder tip E of the outer layer 12 passes through the outer layer 12 to be focused on the shoulder tip E1 of the hollow inner container 11. Then, a resin color of the shoulder tip E1 appears in a light color highlighted against the resin color of the body portion A and the shoulder portion C, which should be in the same color.

Then, when the multilayered cosmetic container 10 is seen from a side, a boundary between a portion, which appears in the light color, and a portion, which does not appear in the light color, has the appearance such that a shadow of contents is seen through.

On the other hand, when the curvature of the shoulder tip E of the outer layer 12 is not smaller than 1.0 mm, the curvature of the shoulder tip E1 of the hollow inner container is smaller than the same, and centers O and P of the curvature radii do not conform to each other as illustrated in FIG. 3, the incident light on the shoulder tip E is dispersed and is not focused, or this is focused on the shoulder portion closer to the neck portion than the shoulder tip, so that the appearance is not such that the shadow of the contents is seen through. That is to say, there is no danger of misunderstanding that the contents are always left.

Meanwhile, a curvature radius R of the shoulder tip of the outer layer is preferably not smaller than twice as large as a curvature radius r of the hollow inner container because of an effect to inhibit a phenomenon that a color of the shoulder tip of the hollow inner container appears to change and of excellent molding property of the outer layer.

By characterizing the shape of the shoulder tip E of the multilayered cosmetic container 10 as described above, the phenomenon that the color of the shoulder tip of the hollow inner container appears to change is inhibited and the outer layer may be stably shaped.

Comparison Between Example and Comparative Example

Next, the appearance of an example and that of a comparative example are compared to each other. Meanwhile, in the following example and comparative example, the hollow inner container with a pattern of the same color density in each portion was used and the outer layer, which is transparent in each portion, was used. Then, only a shape of the shoulder portion of the multilayered cosmetic container was changed as follows.

First Example

As a first example, the curvature radius R of the shoulder tip of the outer layer 12 was set to 6.8 mm and the curvature radius r of the shoulder tip of the hollow inner container 11 was set to 1.0 mm. Also, a thickness Da of the shoulder portion C of the outer layer 12 was set to 1.8 mm and a thickness Db of the body portion A of the outer layer 12 was set to 3.3 mm. The centers of the curvatures do not conform to each other.

An effect of the structure of this example on the appearance in this case is described. FIG. 3 is an illustrative diagram illustrating relationship between the incident light and reflected light of the multilayered cosmetic container 10 of this example.

As illustrated in FIG. 3, the incident light on the outer layer 12 is reflected on a surface of the hollow inner container 11 to be outgoing light. At that time, the reflected light is appropriately dispersed and is not focused in a specific direction. If the reflected light is focused in the specific direction, the phenomenon that the appearance of the multilayered cosmetic container 10 has the light color only on the shoulder portion C occurs. Therefore, according to the configuration of this example in which the reflected light is dispersed, the phenomenon that the appearance of the multilayered cosmetic container 10 has the light color only on the shoulder portion C may be prevented.

Second Example

As a second example, the curvature radius R of the shoulder tip of the outer layer 12 was set to 14 mm and the curvature radius r of the shoulder tip of the hollow inner container 11 was set to 11 mm. Also, the thickness Da of the shoulder portion C of the outer layer 12 was set to 2.9 mm and the centers of the curvatures do not conform to each other.

According to the configuration of this example, as with the above-description, the phenomenon that the appearance of the multilayered cosmetic container 10 has the light color only on the shoulder portion C may be prevented.

Third Example

As a third example, the curvature radius R of the shoulder tip of the outer layer 12 was set to 8.0 mm and the curvature radius r of the shoulder tip of the hollow inner container 11 was set to 3.0 mm. Also, the thickness Da of the shoulder portion C of the outer layer 12 was set to 2.7 mm and the centers of the curvatures do not conform to each other. According to the configuration of this example, as with the above-description, the phenomenon that the appearance of the multilayered cosmetic container 10 has the light color only on the shoulder portion C may be prevented.

Fourth Example

As a fourth example, the curvature radius R of a bottom corner portion of the outer layer 12 was set to 2.7 mm and the curvature radius r of a bottom corner portion of the hollow inner container 11 was set to 1.8 mm. Also, the thickness of the bottom portion of the outer layer 12 was set to 5.5 mm and the centers of the curvatures do not conform to each other. According to the configuration of this example, as with the above-description, the phenomenon that the appearance of the multilayered cosmetic container 10 has the light color only on the bottom corner portion may be prevented.

Then, by examining these examples by further changing a capacity of the container, it was found that the thickness Da of the shoulder portion C of the outer layer 12 is preferably not larger than 3.5 mm on the maximum site. Also, it was found that the thickness of the bottom corner portion is preferably not smaller than 2.8 mm on a minimum site and the curvature radius of the bottom corner portion of the outer layer is preferably 2 to 10 mm.

First Comparative Example

Figure 4A:
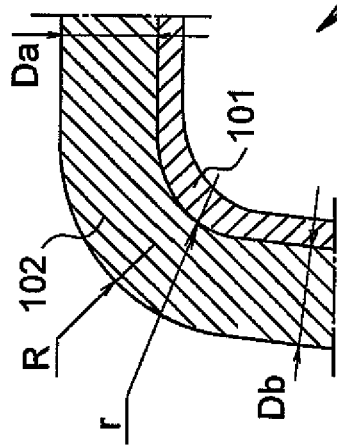
FIGS. 4A to 4C are illustrative views of the multilayered cosmetic container according to a first comparative example.
Figure 4B:
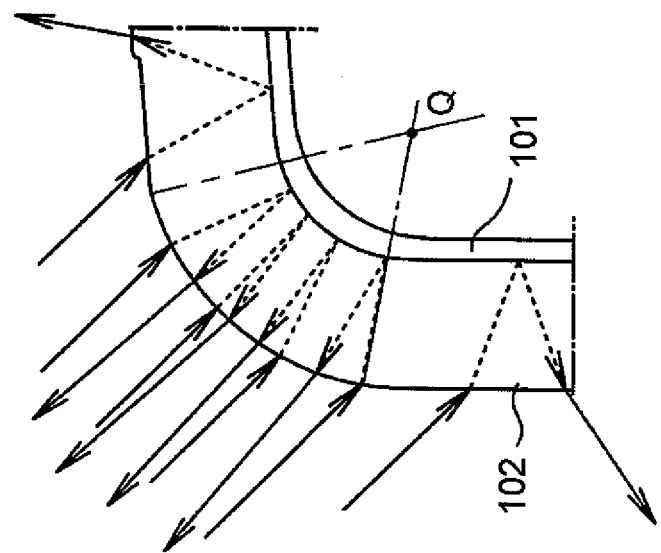
Figure 4C:
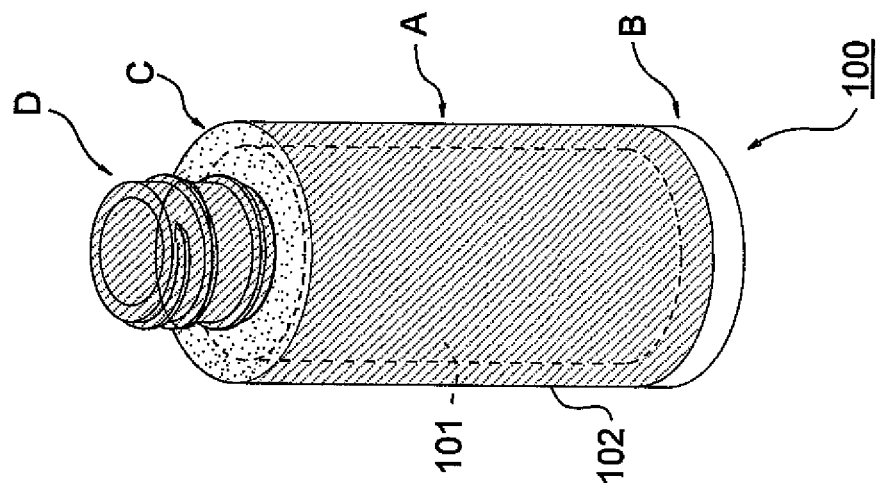

A problem of a shape of the first comparative example is described with reference to FIGS. 4A to 4C. FIGS. 4A to 4C are illustrative diagrams of the multilayered cosmetic container according to the first comparative example.

As the first comparative example, the curvature radius R of an outer layer 102 and the curvature radius r of a hollow inner container 101 illustrated in FIG. 4A were set to 3.0 mm and 1.5 mm, respectively. Also, the thickness Da of the shoulder portion C of the outer layer 102 was set to 1.5 mm and the thickness Db of the body portion A of the outer layer 102 was set to 1.5 mm. The centers Q of the curvatures conform to each other.

In this case, as illustrated in FIG. 4B, the incident light on the outer layer 102 is reflected on the surface of the hollow inner container 101 to be the outgoing light. At that time, the reflected light is focused in the specific direction of the shoulder portion C, and as a result, the light is amplified. Then, the phenomenon that the color of the hollow inner container 101 becomes the light color only on the shoulder portion C as the appearance of a multilayered cosmetic container 100 occurs as illustrated in FIG. 4C. As a result, the boundary between the portion, which has the light color, and the portion, which does not have the light color, has the appearance such that the shadow of the contents is seen through, so that this causes misunderstanding of a user.

Second Comparative Example

As a second comparative example, the curvature radius R of the outer layer 12 was set to 6.8 mm and the curvature radius r of the hollow inner container 101 was set to 16.1 mm. Also, the thickness Da of the shoulder portion C of the outer layer 102 was set to 1.5 mm and the thickness Db of the body portion A of the outer layer 102 was set to 1.5 mm.

In this case, the phenomenon that the appearance of the multilayered cosmetic container 100 has the light color only on the shoulder portion C occurred. Also, the appearance on the shoulder portion C had a lighter color than that in the first comparative example.

Meanwhile, although the shoulder tip is described in detail as an example of the corner portion in the above-described embodiment, there is no limitation. That is to say, this technology may be applied to the bottom corner portion. This is because similar attention should be given also to the bottom corner portion when the container is normally put in an inverted state with a closed opening side down. In this case, the shoulder portion and the shoulder tip are replaced with a bottom surface portion and a bottom surface corner portion, respectively.

While the present invention has been described with reference to exemplary embodiments, it is to be understood that the invention is not limited to the disclosed exemplary embodiments.

The scope of the following claims is to be accorded the broadcast interpretation so as to encompass all such modifications and equivalent structures and functions.

This application claims the benefit of Japanese Patent Application No. 2010-250967, filed Nov. 9, 2010, No. 2011-218876, filed Oct. 3, 2011, which are here by incorporated by reference herein in their entirety.

What is claimed is:

1. A multilayered cosmetic container, comprising:
an opaque or translucent hollow inner container made of a synthetic resin, with a hollow inner portion including a neck portion, which forms an opening, a body portion with a diameter larger than a diameter of the neck portion, and a shoulder portion, which connects the body portion to the neck portion; and
a transparent or translucent outer layer formed by an injection of a melting resin over-molded on an outer side of the hollow inner container except a part of the neck portion or an entire neck portion, or the entire neck portion and a part of the shoulder portion, wherein
a curvature radius of a shoulder tip, which connects the shoulder portion to the body portion of the hollow inner container is smaller than the curvature radius of a shoulder tip of the outer layer, which covers the shoulder tip of the hollow inner container, and centers of the curvature radii of the shoulder tip of the hollow inner container and the shoulder tip of the outer layer do not conform to each other, wherein
a difference in an outer diameter between the neck portion and the body portion is at least not smaller than 3 mm on a minimum side, a curvature of the shoulder tip between the body portion and the shoulder portion of the hollow inner container and the curvature of the outer layer, which covers the shoulder tip, are not smaller than 1.0 mm, and a thickness of the outer layer on an end point of a bending portion of the shoulder tip, which connects the body portion to the shoulder portion, in a drooping direction is not larger than 3.5 mm on a maximum side.

2. The multilayered cosmetic container according to claim 1, wherein
the curvature radius of the shoulder tip of the outer layer is 5 to 15 mm, and the curvature radius of the shoulder tip of the hollow inner container is not smaller than 1.0 mm.

3. A multilayered cosmetic container, comprising:
an opaque or translucent hollow inner container made of a synthetic resin with a hollow inner portion including a neck portion, which forms an opening, a body portion with a diameter larger than a diameter of the neck portion, and a shoulder portion, which connects the body portion to the neck portion; and
a transparent or translucent outer layer formed by an injection of a melting resin over-molded on an outer side of the hollow inner container except a part of the neck portion or an entire neck portion, or the entire neck portion and a part of the shoulder portion, wherein
a curvature radius of a shoulder tip, which connects the shoulder portion to the body portion of the hollow inner container is smaller than the curvature radius of a shoulder tip of the outer layer, which covers the shoulder tip of the hollow inner container, and centers of the curvature radii of the shoulder tip of the hollow inner container and the shoulder tip of the outer layer do not conform to each other, wherein
the curvature radius of the shoulder tip of the outer layer between the body portion and the shoulder portion of the outer layer is not smaller than twice as large as the curvature radius of the shoulder tip, which connects the shoulder portion to the body portion of the hollow inner container.

4. A multilayered cosmetic container, comprising:
an opaque or translucent hollow inner container made of a synthetic resin with a hollow inner portion including a neck portion, which forms an opening, a body portion with a diameter larger than the diameter of the neck portion, and a bottom corner portion, which connects the body portion to a bottom surface of the container; and
a transparent or translucent outer layer formed by injection of a melting resin over-molded on an outer side of the hollow inner container except a part of the neck portion or an entire neck portion, or the entire neck portion and a part of a shoulder portion, wherein
a curvature radius of the bottom corner portion between the body portion of the hollow inner container and the bottom surface of the container is smaller than the curvature radius of a bottom corner portion of the outer layer, which covers the bottom corner portion, and centers of the curvature radii of the bottom corner portion and the bottom corner portion of the outer layer do not conform to each other, wherein
a difference in an outer diameter between the neck portion and the body portion is at least not smaller than 3 mm on a minimum side, a curvature of the bottom corner portion between the body portion of the hollow inner container and the bottom surface of the container and the curvature of the outer layer, which covers the bottom corner portion, are not smaller than 1.0 mm, and a thickness of the outer layer on an end point of a bending portion of the bottom corner portion, which connects the body portion to the bottom surface of the container, in a drooping direction is not smaller than 2.8 mm on the minimum side.

5. The multilayered cosmetic container according to claim 4, wherein
the curvature radius of the bottom corner portion of the outer layer is 2 to 10 mm and the curvature radius of the bottom corner portion of the hollow inner container is not smaller than 1.0 mm.

* * * * *